United States Patent
Swiszcz

(10) Patent No.: US 12,502,875 B2
(45) Date of Patent: Dec. 23, 2025

(54) LAMINATE FOR ARCHITECTURAL STRUCTURES

(71) Applicant: Hunter Douglas Inc., New York, NY (US)

(72) Inventor: Paul G. Swiszcz, Niwot, CO (US)

(73) Assignee: Hunter Douglas Inc., New York, NY (US)

( * ) Notice: Subject to any disclaimer, the term of this patent is extended or adjusted under 35 U.S.C. 154(b) by 589 days.

(21) Appl. No.: 16/600,616

(22) Filed: Oct. 14, 2019

(65) Prior Publication Data

US 2020/0114629 A1    Apr. 16, 2020

Related U.S. Application Data

(60) Provisional application No. 62/746,068, filed on Oct. 16, 2018.

(51) Int. Cl.
| | |
|---|---|
| *B32B 27/12* | (2006.01) |
| *B32B 1/00* | (2024.01) |
| *B32B 5/02* | (2006.01) |
| *B32B 7/12* | (2006.01) |
| *B32B 15/08* | (2006.01) |

(Continued)

(52) U.S. Cl.
CPC .............. *B32B 27/12* (2013.01); *B32B 5/022* (2013.01); *B32B 15/08* (2013.01); *B32B 15/14* (2013.01); *B32B 2262/0276* (2013.01); *B32B 2419/00* (2013.01)

(58) Field of Classification Search
None
See application file for complete search history.

(56) References Cited

U.S. PATENT DOCUMENTS

| | | | | | |
|---|---|---|---|---|---|
| 4,029,838 | A | * | 6/1977 | Chamis | B32B 15/14 428/293.1 |
| 4,230,763 | A | * | 10/1980 | Skolnick | B32B 23/10 428/458 |

(Continued)

FOREIGN PATENT DOCUMENTS

| | | |
|---|---|---|
| CN | 201031599 Y | 3/2008 |
| JP | 2016 068280 | 5/2016 |

(Continued)

OTHER PUBLICATIONS

PCT/US2019/056185, International Search Report and Written Opinion, dated Dec. 12, 2019.

(Continued)

*Primary Examiner* — Frank J Vineis
*Assistant Examiner* — Nicole T Gugliotta
(74) *Attorney, Agent, or Firm* — Dority & Manning, P.A.

(57) ABSTRACT

The present disclosure is generally directed to a fabric laminate for architectural coverings. The laminate generally contains a polymer film, optionally metallized on one or more sides, with at least one layer of a nonwoven web disposed on each side of the film. In one embodiment, at least one nonwoven web on each side of the film may contain a majority of fibers oriented in one direction, and, in some cases, the orientation direction of at least one web on one side of the film coincides with the orientation direction of at least one web on the opposite side of the film. In this manner, the fabric may demonstrate improved stiffness in one direction, such as the machine direction.

18 Claims, 6 Drawing Sheets

(51) Int. Cl.
  *B32B 15/14*  (2006.01)
  *B32B 27/20*  (2006.01)
  *B32B 27/30*  (2006.01)
  *B32B 27/32*  (2006.01)
  *B32B 27/36*  (2006.01)

(56) References Cited

U.S. PATENT DOCUMENTS

| | | | | |
|---|---|---|---|---|
| 4,467,005 | A * | 8/1984 | Pusch | E04B 1/78 |
| | | | | 428/920 |
| 4,634,637 | A | 1/1987 | Oliver et al. | |
| 4,915,763 | A * | 4/1990 | Swiszcz | B32B 38/164 |
| | | | | 427/430.1 |
| 5,208,098 | A | 5/1993 | Stover | |
| 6,100,208 | A | 8/2000 | Brown | |
| 7,117,917 | B2 * | 10/2006 | Allsopp | E06B 9/262 |
| | | | | 160/84.04 |
| 7,994,081 | B2 | 8/2011 | Farell et al. | |
| 2002/0028332 | A1 * | 3/2002 | Pratt | B29C 70/16 |
| | | | | 428/364 |
| 2003/0124310 | A1 * | 7/2003 | Ellis | D04H 1/56 |
| | | | | 428/138 |
| 2011/0262699 | A1 * | 10/2011 | Yializis | C23C 14/5826 |
| | | | | 428/138 |
| 2015/0030804 | A1 | 1/2015 | Baser | |
| 2018/0119487 | A1 | 5/2018 | Colson et al. | |

FOREIGN PATENT DOCUMENTS

| | | |
|---|---|---|
| JP | 2017 015920 | 1/2017 |
| WO | WO 2016/210312 | 12/2016 |

OTHER PUBLICATIONS

Search Report with English Translation issued in TW Patent Application No. 108137113 Mailed Dec. 9, 2023 (2 pages).

* cited by examiner

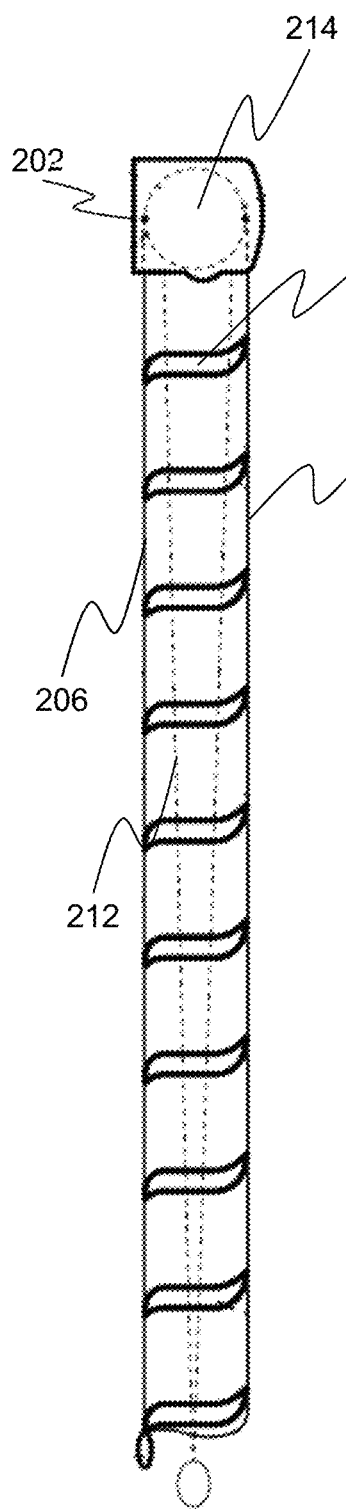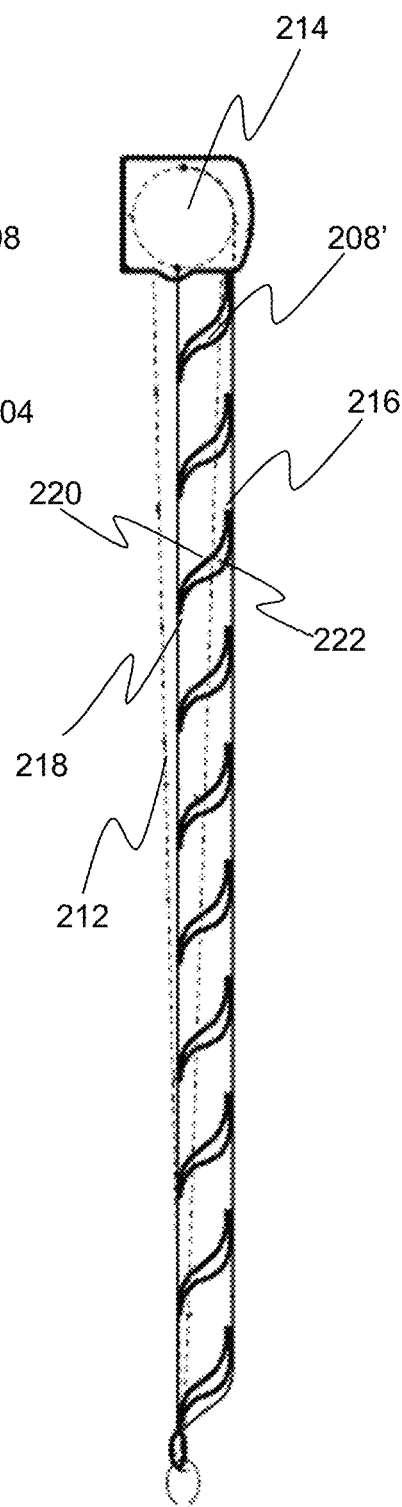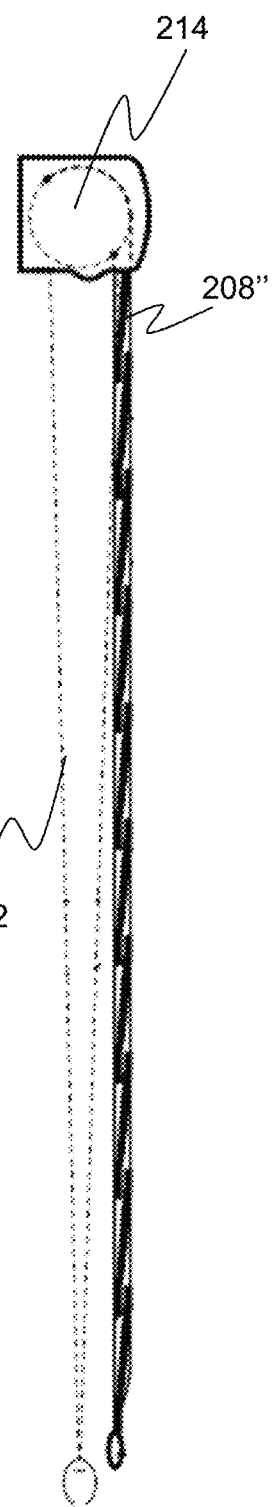
*FIG. 4*  *FIG. 5*  *FIG. 6*

LAMINATE FOR ARCHITECTURAL STRUCTURES

RELATED APPLICATIONS

The present application is based on and claims priority to U.S. Provisional Patent application Ser. No. 62/746,068 filed on Oct. 16, 2018, which is incorporated herein by reference.

FIELD OF THE INVENTION

The field of the present invention pertains to fabric laminates, including nonwoven fabric laminates which comprise a polymer film, that may be used as a component in coverings for architectural structures.

BACKGROUND

Coverings for architectural structures or features such as architectural openings including windows, doors, archways, and the like (hereinafter "architectural structures" for the sake of convenience without intent to limit) come in many different forms and configurations. In addition to draperies, such architectural coverings, or "coverings" for the sake of non-limiting simplicity, can include blinds, shades, and the like. In some applications, the covering is retractable or extendable across the architectural structure to alter the amount of light passage and visibility across the covering. Different types of architectural coverings include, for instance, roller blinds and roller shades, pleated shades, roman shades, vertical blinds, shutters, woven wood shades, and cellular shades.

During use, different coverings may fold the fabric of the covering element along a given direction to retract the covering. Some coverings may include operable vanes that are movable between open and closed positions. In general, however, current trends demand the use of fabrics not previously used in architectural structure covering construction (e.g., lightly woven fabrics and fabric constructions that have an inherent high level of drape or other physical characteristics not amenable to the operable covering or a desired end use). For example, it may be desirable to design the architectural covering to diffuse, block, or black out natural light. Some applications have employed metallized films for their good light-blocking performance. In other applications, various nonwoven webs have been laminated to films in order to block or filter light. However, such laminates often have inherent physical properties that offer poor support for uniformity and/or flatness in appearance. This creates an appearance with creases, puckering, or other undesirable non-uniform undulations or characteristics.

In view of the above, a material with improved physical properties including light-blocking or light-diffusing properties for architectural coverings is needed.

SUMMARY

The present disclosure is generally directed to a fabric laminate for an architectural covering and a method for producing the same. The laminate includes a film layer which has a first side, and a second and opposite side. The film layer defines a first direction, and a second direction perpendicular to the first direction. A first nonwoven web may be positioned on the first side of the film layer, and the first nonwoven web may contain synthetic fibers. A second nonwoven web may be positioned on the second side of the film layer, and the second nonwoven web may also contain the same or different synthetic fibers. In one embodiment, a majority of the fibers in the first nonwoven web and the second nonwoven web are oriented along the first direction. In this manner, the stiffness of the laminate in the first direction may be greater than the stiffness of the laminate in the second direction. In one embodiment, the first and second nonwoven webs are wet laid webs.

In one embodiment, the laminate further includes at least one metallized layer positioned between one side of the film layer and a nonwoven web.

In one embodiment, the synthetic fibers in at least one nonwoven web may comprise binder fibers, such as conjugate fibers, having a core-and-sheath structure. The binder fibers may be thermally bonded to other fibers in the nonwoven web.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 4 is a side view of the architectural structure covering illustrated in FIG. 3;

FIG. 5 is a side view of the architectural structure covering illustrated in FIG. 3;

FIG. 6 is a side view of the architectural structure covering illustrated in FIG. 3;

Figure 1:
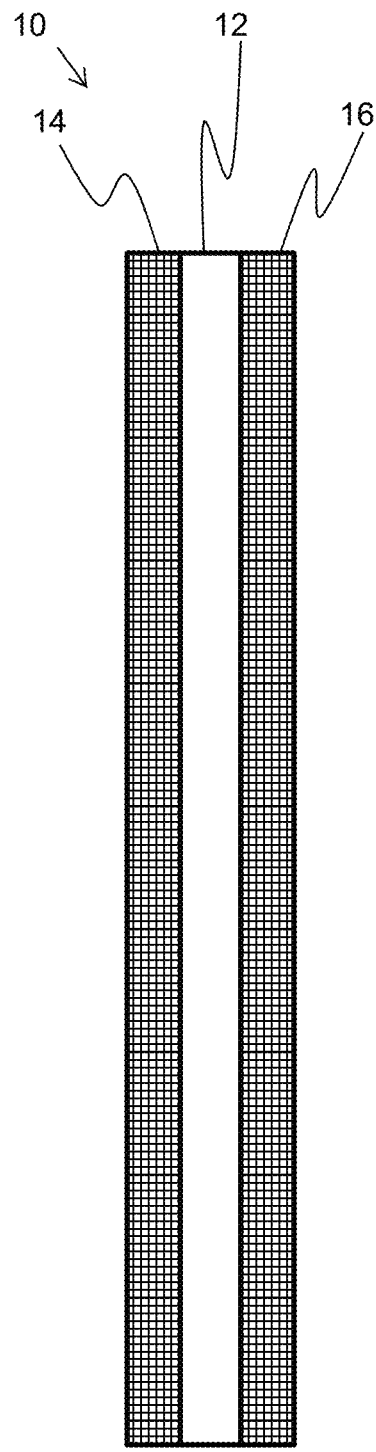
FIG. 1 is a cross-section of one embodiment of a laminate made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a fabric laminate for architectural coverings. The laminate generally contains a polymer film wherein a nonwoven web is disposed on at least one side of the film. For instance, in one embodiment, a first nonwoven web is disposed on one side of the polymer film while a second nonwoven web is disposed on an opposite side of the polymer film. In accordance with the present disclosure, at least one of the nonwoven webs can be made from fibers wherein a majority of the fibers are oriented in one direction. For example, in one particular embodiment, the first nonwoven web on one side of the polymer film and the second nonwoven web on the opposite side of the polymer film both contain fibers oriented in the same direction.

In one advantageous aspect, the orientation of the nonwoven webs may be manipulated to construct a fabric laminate having desirable drape or hand characteristics. For example, films which display an unwanted wrinkled texture may be augmented as above to provide for a fabric laminate that demonstrates clean fold, crease, and drape properties while maintaining the light-blocking or light passage performance of the underlying film. In some instances, the stiffness may be enhanced or increased, sometimes significantly, in one direction along the fabric. In some embodiments, the stiffness of the fabric may be augmented in one direction while remaining substantially the same in another direction. For example, fiber orientation within the nonwoven webs can be manipulated and controlled so as to have a desired degree of unidirectional stiffness. In this manner, a laminate can be formed that has greater flexibility in one direction in comparison to a perpendicular direction. Thus, the material can flex and move in one direction while still creating a uniform appearance due to being stiffer in a perpendicular direction.

In another advantageous aspect, the laminated web layers may soften the texture of the film and dampen unwanted noise or rustling in an architectural covering product. Additionally, the applied nonwoven layers may remain highly receptive to dyes, inks, or other applied graphics for a high degree of visual customization and adaptation to different covering needs. In one instance, a nonwoven web may be constructed to permit partial visibility of the underlying film, such as by forming a web with a mesh-like quality or degree of openness. For example, if the film is transparent, the fabric laminate may have a sheer quality.

In some embodiments, the nonwoven webs may provide protection to the underlying film. For example, chemical and mechanical damage of the film can occur when the film is subjected to high heat and humidity conditions and/or where the film is frequently handled and manipulated. In addition, cleaning fluids, such as window cleaners, also have a tendency to degrade film layers.

In one embodiment of the present disclosure, as will be described in greater detail below, the one or more nonwoven webs located adjacent to the film layer comprise wet laid webs made by depositing an aqueous suspension of fibers onto a moving forming surface in a manner such that a majority of the fibers are oriented in one direction. The use of a wet laid web can provide various advantages and benefits. For instance, the physical properties of the web can be manipulated by controlling the wet lay process and/or selecting the type of fibers that are used to form the web. For example, the above techniques can be used to alter the physical properties of the web so that the web is optimized for a particular application. For instance, the stiffness and the tactile softness of the web can be controlled. In one embodiment, for instance, wet laid webs can be made in accordance to the present disclosure that have augmented stiffness properties in one direction compared with the stiffness properties of the web in a perpendicular direction. Controlling the stiffness properties of the web in perpendicular directions results in nonwoven webs having excellent drape properties, especially when laminated to a film. Film laminates made in accordance with the present disclosure, for instance, can hang or drape without forming creases, forming puckered regions, or forming other undesirable non-uniform undulations.

As used herein, "light-blocking" is not limited to an impermeable light barrier. For example, "light-blocking" may include the blocking of only some light, such as by a diffusive barrier. In some examples, the fabric laminate of the present disclosure may be used as a blackout material to effectively block all light. In other examples, the material may diffuse incoming light and pass a soft glow of variable intensity from one side of the material to the next. In other examples, the laminate may be substantially sheer and provide a screen effect without significantly distorting or diffusing the incident light. Furthermore, the light-blocking capacity of the material is not limiting to the applications of the material. For example, a material capable of blocking a substantial portion of incident light, such as a blackout material, may be used selectively within an architectural covering to only block portions of an incident light source, the portions perhaps being in a reconfigurable arrangement, such as in the vanes of a blind, while other portions of the incident light may merely be diffused.

Referring to FIG. 1, one embodiment of a fabric laminate 10 made in accordance with the present disclosure is shown. The fabric laminate 10 contains three layers of material. It should be understood, however, that fabric laminates made in accordance with the present disclosure can contain anywhere from two layers of material to nine or more layers of material. As shown in FIG. 1, the three-layer laminate 10 includes a polymer film layer 12 laminated to a first nonwoven web 14 on one side of the film 12 and a second nonwoven web 16 laminated to an opposite side of the film 12. The two nonwoven webs 14 and 16 include fibers that are oriented in one direction and can be formed through a wet laid process.

The fabric laminate 10 as shown in FIG. 1 includes a polymer film 12 that forms the middle layer of the laminate. In general, the polymer film 12 can be made from any suitable polymer. For example, the polymer film can be made from a polymer that can be formed into a relatively thin layer while having sufficient mechanical properties for use in a laminate and in an architectural covering. The polymer film 12, for instance, can be made from a polyester polymer, a polyolefin polymer such as polyethylene or polypropylene, a polyvinyl chloride polymer, copolymers thereof, and the like. In one embodiment, for instance, the polymer film 12 comprises a polyester film. The polyester film, for instance, may comprise polyethylene terephthalate.

In one embodiment, for instance, the polymer film 12 can be formed from a polyester resin that is melted and blown or extruded as an amorphous sheet onto a polished revolving casting drum to form a cast sheet of the polymer and stretched. Stretched polyester films have been found particularly well suited for use in the laminate of the present disclosure due to their ability to adhere to other materials, their ability to be formed into relatively thin sheets, and due to their strength and flexural modulus characteristics. For instance, the film can optionally be stretched in one direction or in two directions, such as to impart directional properties to the film, including strain-induced crystallinity, molecular orientation, or both. For example, in one embodiment, the film is biaxially oriented, meaning that the film is stretched in both the longitudinal direction and the transverse direction while still in a softened state. For example, the film can be stretched in the longitudinal direction in an amount of from about 1.5 times to about 10 times its original length including all increments of 0.5 times therebetween. Similarly, the film can be stretched in the transverse direction at a draw ratio of greater than about 1.5 to about 8 including all increments of 0.5 therebetween. After stretching, the film 12 can also optionally be heat treated. Heat treating the film can crystallize the polyester film and impart stability and increase tensile properties.

The thickness of the polymer film 12 can vary depending upon the particular application. For instance, the film thickness can be increased to improve strength properties, or, alternatively, the film thickness may be decreased to enhance the flexibility of the fabric laminate. For example, the film thickness can be selected such that the film has sufficient strength to be laminated to other materials and thereafter form a vane or other portion of an architectural covering while still having sufficient flexibility to allow laminates made from the film to flex in at least one direction during use. The thickness of the film 12 can generally vary over a thickness range of from about 5 microns to about 50 microns, including all increments of 1 micron therebetween. In some examples, the film can have a thickness of less than about 50 microns, including increments of less than 1 micron thereafter, such as less than about 40 microns, such as less than about 30 microns, such as less than about 20 microns, such as even less than about 15 microns. The thickness of the film is generally greater than about 5 microns, including increments of greater than 1 micron thereafter, such as greater than 8 microns, such as greater than 10 microns.

If desired, filler particles may be added to the polymer film 12. For example, a white filler such as calcium carbonate, titanium oxide, or barium sulfate may be added to the film. Filler particles, for instance, can be added to the polymer film in order to change the color of the film for aesthetic purposes. For instance, the color of the film can be coordinated with the color of the nonwoven layers adhered to the film. The film may be tinted to suit any particular application using a variety of greyscale or colored fillers or pigments. In one embodiment, a tinted film may permit the passage of some light (with or without distortion or diffusion) while blocking at least some ultraviolet (UV) rays. However, a clear or transparent film 12 may also be used.

In accordance with the present disclosure, as shown in FIG. 1, the laminate 10 includes two nonwoven webs 14 and 16. In the embodiment illustrated in FIG. 1, the nonwoven webs 14 and 16 form the exterior surfaces of the laminate 10. The nonwoven webs 14 and 16 are attached to the laminate in order to improve the aesthetic qualities of the laminate and/or to improve one or more physical properties of the laminate. For example, in one embodiment, the nonwoven webs 14 and 16 can be designed to modify the softness and stiffness characteristics of the laminate 10 in a desired manner. The nonwoven webs 14 and 16, for instance, can be applied to each side of the film 12 in order to modify the drape properties of the film to achieve desired flexibility characteristics and stiffness characteristics that make the laminate 10 resistant to creases, puckering, and other undesirable undulations when incorporated into an architectural covering. The nonwoven webs 14 and 16 can also desirably affect the light transmission properties of the laminate 10. For ease of reference and as an illustrative example, the present disclosure describes the stiffness and flexibility of the laminate in terms of machine direction and cross direction. It is contemplated that the machine direction and the cross direction of the laminate do not necessarily correspond to any particular orientation of any final embodiment comprising the laminate (e.g., the orientation of a vane in a shade). Thus, it should be appreciated that the specific orientations described herein (e.g., machine direction and cross direction) are for illustration purposes and for ease of reference and do not define the scope of the present disclosure.

In general, the nonwoven webs 14 and 16 are formed from fibers that are primarily oriented in one direction. Orienting the fibers in one direction can increase the stiffness of the material in the direction of orientation. In one embodiment, the nonwoven webs 14 and 16 are laminated to the film 12 such that the fibers oriented in the web 14 are generally parallel with the fibers oriented in the web 16. For instance, the majority of the fibers in the first nonwoven web 14 and the majority of the fibers of the second nonwoven web 16 can both be oriented along the same direction when the webs are incorporated into the laminate 10.

In one embodiment, at least one nonwoven web 14, 16 comprises a wet laid web. In the wet laying process, a liquid suspension (such as an aqueous suspension) of fibers or a fiber furnish may be deposited by a headbox onto a forming mesh or fabric. Generally, the forming mesh permits the draining and drying of the furnish, optionally including controlled vacuum dewatering systems. In accordance with the present disclosure, it was discovered that wet laid webs can provide various advantages when used in the laminate 10 as shown in FIG. 1. The physical properties of the wet laid web, for instance, can be manipulated and controlled through the web forming process and by selecting the type and amount of fibers incorporated into the web. Of particular advantage, wet laid webs can be made with desired physical properties at extremely low basis weights. Thus, the wet laid webs can have a beneficial effect on the drape characteristics of the laminate while adding a minimum amount of weight to the laminate.

In one embodiment, the fiber furnish is deposited onto one or more consecutive forming fabrics with the fibers aligned in one particular or selected direction. For instance, if the forming mesh has a surface speed different than the speed at which the fiber suspension leaves the headbox (e.g., higher or lower speed), fibers may be laid onto the forming mesh in alignment with the direction of motion of the forming mesh (e.g., the machine direction) as the fibers are either dragged or pushed by the aforementioned surface speed differential. In some cases, the rate of drying may be increased, such as with vacuum systems, to lock in the orientation of the fibers as laid on the forming mesh while minimizing opportunities for the fibers to re-disperse. The direction and magnitude of the surface speed differential as well as the rate of drying may be controlled to achieve the desired orientation of the fiber furnish.

The amount and type of fiber used to form the wet laid nonwoven webs 14 and 16 can vary depending upon the particular application and the desired result. In one embodiment, for instance, the nonwoven webs 14 and 16 are made exclusively from synthetic or polymer fibers. The fibers can comprise, for instance, short fibers, staple fibers, longer fibers, filaments, and the like. The synthetic fibers can be made from any suitable polymer, such as a polyester polymer, a polyolefin polymer such as polyethylene or polypropylene, an acrylic polymer, and the like. In one embodiment, the nonwoven web 14 and 16 can also contain cellulosic fibers, such as pulp fibers, regenerated cellulose fibers such as rayon, cotton fibers, and the like.

In order to improve web integrity, the wet laid nonwoven webs 14 and 16 generally contain a binder. The binder can be used to bond the fibers together within the web thereby increasing strength and locking in the stiffness characteristics. Although the binder may be an adhesive sprayed or otherwise applied to the web, in one embodiment, the binder is comprised of binder fibers incorporated into the web. As used herein, binder fibers are fibers that can bond to other fibers in the web using chemical, mechanical, or thermal means. For instance, in one embodiment, the binder fibers may comprise thermally bondable fibers that, when heated, form thermal bonds with other fibers at their point of intersection.

When the nonwoven webs contain thermally bondable fibers, the webs can be heated in order to activate the fibers and cause bonding to occur within the web. The web can be heated using various different processes or techniques. For instance, in one embodiment, the wet laid web can be fed through heated calendar rolls that can reduce the thickness of the web while simultaneously cause the binder fibers to form bonds at points of intersection with other fibers. In an alternative embodiment, a hot fluid, such as air, can be blown through the wet laid web in order to cause fiber bonding to occur. Using a flow of heated air may preserve the bulk of the web.

The type and amount of binder fibers incorporated into the wet laid nonwoven webs 14 and 16 can have a substantial impact on the stiffness properties of the web. In general, for instance, greater amounts of binder fibers can increase the stiffness of the web in the direction of fiber orientation. Thus, the content of binder fibers within the nonwoven webs 14 and 16 can be varied to manipulate the stiffness characteristics of the web.

In some examples, the ratio between the machine direction stiffness and the cross-direction stiffness can be adjusted by selective use of binder fibers. For example, if fibers are aligned in the cross-direction, then increasing the fiber bonds may increase the stiffness in the cross-direction. Thus, the amount of binder fibers incorporated into the nonwoven web can be used to control and/or increase the ratio between the machine direction stiffness and the cross-directional stiffness or the ratio of the stiffness in one direction versus the stiffness of the web in a perpendicular direction.

In general, binder fibers can be present in the wet laid nonwoven web in an amount sufficient to lock in the orientation of the fibers but in an amount insufficient to increase the stiffness properties so as to completely destroy the drape properties of the web. For example, the binder fibers can be present in the nonwoven web in an amount greater than about 5% by weight, including all increments of 1% by weight thereafter, such as greater than about 10% by weight, such as greater than about 15% by weight, such as greater than about 20% by weight, such as greater than about 25% by weight, such as greater than about 30% by weight, such as greater than about 35% by weight, such as greater than about 40% by weight, such as greater than about 45% by weight. In one embodiment, the wet laid nonwoven web can be made exclusively from binder fibers. In other embodiments, the binder fibers can generally be present in an amount less than about 80% by weight, including all increments of 1% by weight thereafter, such as by being present in the nonwoven web in an amount less than about 75% by weight, such as in an amount less than about 70% by weight, such as in an amount less than about 65% by weight, such as in an amount less than about 60% by weight, such as in an amount less than about 55% by weight.

As described above, the binder fibers can be made from various different materials. In one embodiment, the binder fibers are made from a polymer having a lower melting temperature. For instance, the binder fibers can be made from a polymer, such as a polyolefin, having a melting temperature of less than about 200° C., such as less than about 180° C., such as less than about 160° C., such as less than about 140° C., such as less than about 120° C., such as less than about 100° C. and generally greater than about 80° C., such as greater than about 90° C., including all increments of 1° C. therebetween.

In one embodiment, the nonwoven webs 14 and 16 can contain binder fibers that comprise conjugate fibers, such as bicomponent fibers. Conjugate fibers typically have a core-and-sheath structure wherein the core contains a polymer with a higher melting temperature than the polymer of the sheath. In this manner, conjugate fibers may permit good thermal bonding within the nonwoven web while maintaining structural integrity. For instance, the core may contain one polymer selected for its strength and high melting point, and the sheath may contain another polymer selected for its adhesion properties and a lower melting point. For instance, the polymer contained within the sheath may have a melting point of generally less than about 200° C., and greater than about 80° C. including all increments of 1° C. therebetween. The core polymer, on the other hand, can generally have a melting temperature higher than the sheath polymer. In this manner, the sheath polymer when subjected to heat, melts and bonds to other fibers within the web at intersecting points. The core polymer, however, allows the bicomponent binder fiber to retain its shape and provide strength.

The size and the length of the fibers may be selected to achieve the desired softness and hand of the resultant laminate and/or to influence other properties of the nonwoven web. Fibers can be used having a low denier for increased softness to the touch. For instance, the fibers can have a size of from about 0.01 denier to about 10 denier including increments of 0.1 denier therebetween. The length of the fibers can generally be from about 0.1 mm to about 30 mm including increments of 1 mm therebetween. In one embodiment, the length of the fibers may be less than about 15 mm, such as less than about 10 mm. Shorter fibers can also increase softness and flexibility.

The amount of different fiber types and different lengths present in the wet laid nonwoven webs 14 and 16 can vary depending upon the desired physical properties of the resulting web. In one embodiment, the nonwoven web contains binder fibers in conjunction with one other synthetic fiber. In an alternative embodiment, the nonwoven web contains binder fibers in conjunction with two other different types of synthetic fibers. The two other types of synthetic fibers can differ by composition, fiber length, and/or fiber size. The length, size and composition of the fibers can be varied in order to alter the characteristics of the nonwoven web including the tactile feel, the stiffness, and various other physical properties.

The fiber orientation of the nonwoven webs 14, 16 enhances or increases the machine-direction stiffness of the laminate by reducing the flexibility of the laminate in the machine direction. Additionally, because the fibers of the nonwoven web, in some embodiments, extend mainly along the machine direction, with little cross-linking between rows, the stiffness of the web in the cross-direction may remain substantially the same. In this manner, the laminate in the cross-direction can have lower stiffness and higher bending properties. As used herein, "stiffness" may describe tensile, torsional, or bending stiffness, as the orientation of the fibers may be manipulated to enhance any of a variety of mechanical characteristics. For example, the bending stiffness may be characterized by a test using a Handle-O-Meter available from Thwing-Albert Instrument Co. according to ASTM D6828-02, and the tensile stiffness may be characterized by elongation or stretch.

In one embodiment, the fiber orientation in combination with the binder fibers is used to manipulate and control the stiffness properties of the wet laid nonwoven web. More particularly, orienting the majority of the fibers in one direction in conjunction with adding binder fibers can produce a nonwoven web that has much greater stiffness in the direction of fiber orientation in comparison to the stiffness of the web in a direction perpendicular to fiber orientation. A stiffness ratio can be calculated as the ratio of the stiffness in the direction of fiber orientation in comparison to the stiffness in a direction perpendicular to fiber orientation. In order to demonstrate the impact of the nonwoven webs 14 and 16 on the laminate 10, the stiffness ratio can be calculated from the entire fabric laminate. For example, the stiffness ratio of fabric laminates made in accordance with the present disclosure can vary from generally 1.5 to 18, including all increments of 0.5 therebetween. In one embodiment, the wet laid nonwoven webs 14 and 16 can produce a laminate 10 that has a stiffness ratio of greater than 4, such as greater than 5, such as greater than 6, such as greater than 7, such as greater than 8, such as greater than 9, such as even greater than 10.

Using the nonwoven webs 14 and 16 to increase the stiffness ratio of the laminate 10 can greatly and dramatically enhance the drape characteristics of the laminate. In one embodiment, for instance, the stiffness ratio of the laminate 10 is increased using the wet laid nonwoven webs in order to produce a material that does not crease, pucker, or form other undesirable non-uniform undulations, such as wrinkles or other non-uniformities when incorporated into an architectural covering. In this manner, the wet laid nonwoven webs 14 and 16 can completely alter the drape characteristics of the film 12 and improve the overall aesthetic appearance of the product.

The nonwoven webs 14, 16 can have various different characteristics and properties depending upon the particular application. For example, in certain embodiments, each nonwoven web can be lightweight and have a low basis weight, such as a basis weight of less than about 20 gsm (e.g., in 1 gsm increments). Wet laid webs made in accordance with the present disclosure, for instance, can be formed at very low basis weights while still having the desired stiffness properties in one direction and drape properties in an opposite direction. Many other types of nonwoven webs, such as hydroentangled webs or spunbond webs, cannot be formed at the above lower basis weights and have the interdirectional stiffness properties of the nonwoven webs described herein. The ability to incorporate lightweight nonwoven webs into the laminate illustrated in FIG. 1 can provide various advantages and benefits depending upon the particular application and the desired result. For instance, lighter basis weight materials add less weight to the total product or covering, and can be more economical to manufacture. For instance, the nonwoven web can have a basis weight of generally less than about 20 gsm, including increments of less than 1 gsm thereafter, such as less than about 17 gsm, such as less than about 15 gsm, such as less than about 13 gsm, such as less than about 10 gsm, such as less than about 8 gsm, such as less than about 5 gsm, such as less than about 3 gsm and a basis weight generally greater than about 1 gsm (e.g., in 1 gsm increments), such as greater than about 2 gsm, such as greater than about 5 gsm, such as greater than about 7 gsm.

In an alternative embodiment, the nonwoven web can have a higher basis weight, such as a basis weight of greater than about 20 gsm (e.g., in 1 gsm increments). For instance, the basis weight of the nonwoven web can be greater than about 20 gsm, such as greater than about 30 gsm, such as greater than about 40 gsm, and generally less than about 120 gsm (e.g., in 1 gsm increments), such as less than about 60 gsm. Heavier basis weight materials may be desired in certain applications, such as when producing laminates that are designed to block a substantial amount of light.

The nonwoven webs 14, 16 described above may have the same or different properties. For example, both the first nonwoven web 14 and the second nonwoven web 16 may be generally identical. In other examples, the first nonwoven web 14 and the second nonwoven web 16 may have independently selected and optionally different properties. For instance, one web 14 may be formed from a first fiber furnish, while the other web 16 may be formed from a different and independently selected fiber furnish. In this manner, the visual, tactile, and mechanical properties of the fabric laminate may be individually and independently configured for each face or surface of the laminate.

The laminate 10 may comprise thermal bonds between one or more layers directly. In some embodiments, an adhesive may be sprayed, spread, or otherwise applied to one or more layers. In one embodiment, for instance, the adhesive may comprise a hot melt adhesive. The hot melt adhesive, for instance, can comprise a high temperature polymer. For instance, the polymer contained within the hot melt adhesive may have a melting point of greater than about 180° C., including increments of 1° C. thereafter, such as greater than about 190° C., such as greater than about 200° C. In general, the polymer can have a melt point of anywhere between about 180° C. and 400° C. including any 1° C. increment therebetween. A hot melt adhesive is generally a thermoplastic polymer based adhesive which is applied in the molten state and which functions primarily by mechanical attachment. The hot melt adhesive can be applied to the laminate using any suitable method or technique in order to attach together any of the layers of the laminate. For instance, the hot melt adhesive can be applied using a nozzle or a slot die; by extrusion; by depositing meltblown fibers on the substrate; by air knife coating; by Meyer rod coating; or by any other suitable means. In one embodiment, the adhesive comprises a polyester polymer, such as one that can be applied using direct gravure printing or using a knife coating technique. Some example adhesives may include a polyurethane, optionally formed from a polyester and polyether mixture. In one embodiment, the polyester may comprise a copolyester and may be formulated so that minimal amounts of the polymer are needed to attach the fabric material. For instance, in one embodiment, the basis weight of the adhesive may be less than about 20 gsm, including increments of 1 gsm thereafter, such as less than about 15 gsm, such as less than about 12 gsm. The adhesive generally has a basis weight of greater than about 2 gsm, including ranges greater than increments of 1 gsm thereafter, such as greater than about 4 gsm. In general, the adhesive layer can have a basis weight of anywhere of from about 20 gsm to about 1 gsm including any increment of 1 gsm therebetween.

The laminate 10 illustrated in FIG. 1 can be constructed so as to control the amount of light that passes through the laminate when incorporated into a covering for an architectural structure. For example, adjusting the basis weight of the nonwoven webs 14 and 16 and/or adjusting the opacity of the film layer 12 by incorporating a pigment into the film layer can be used to adjust the light transmission properties of the laminate 10. The laminate 10 as shown in FIG. 1 is generally designed to permit some light transmission. In alternative embodiments, however, it may be desirable to construct a laminate that completely blocks light.

Figure 2:
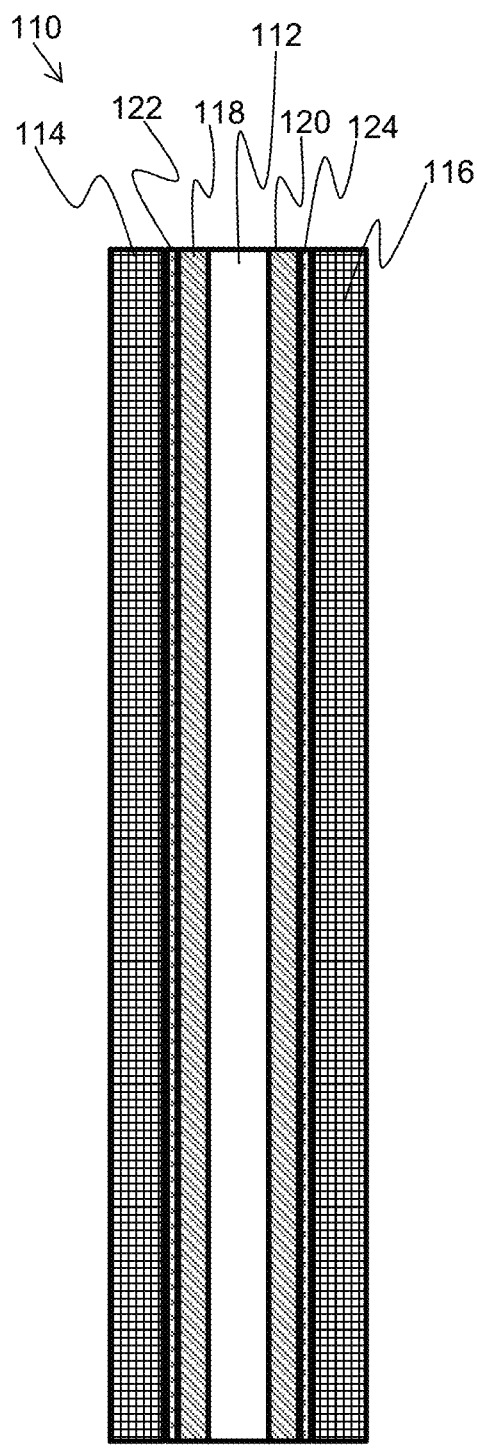
FIG. 2 is a cross-sectional view of another embodiment of a laminate made in accordance with the present disclosure.

For example, referring to FIG. 2, another embodiment of a laminate 110 made in accordance with the present disclosure is shown. Similar to the laminate 10 illustrated in FIG. 1, the laminate 110 shown in FIG. 2 includes a film layer 112 positioned between a first nonwoven web 114 and a second nonwoven web 116. The film layer 112 and the nonwoven webs 114 and 116 can be made as described above with respect to the film layer and nonwoven webs illustrated in FIG. 1.

In the embodiment illustrated in FIG. 2, however, the laminate 110 further contains metallized layers 118 and 120. The metallized layers 118 and 120, for instance, can block light transmission through the laminate and reflect light. As shown, the metallized layer 118 is positioned directly adjacent to one side of the film layer 112 while the second metallized layer 120 is positioned directly adjacent to the opposite side of the film layer 112. The use of two metallized layers 118 and 120 can ensure that little to no light is capable of being transmitted through the laminate 110. For instance, if one of the metalized layers were damaged, the other metallized layer would continue to block light.

The metallized layers 118, 120 may comprise a metal or a metal oxide. For instance, the metallized layers may comprise aluminum, copper, iron, silver, gold, chromium, nickel, zinc, and the like, including oxides thereof and alloys thereof. For instance, in one embodiment, the metallized layers 118, 120 may comprise a chromium alloy or an aluminum alloy containing copper, magnesium, or other metals.

The metallized layers 118, 120 can be formed on the polymer film 112 using various different techniques and methods. For example, the metallic layers can be electroplated or printed on the polymer film. In one embodiment, for instance, the metallized layers are vacuum deposited onto each surface of the polymer film. In a vacuum deposition process, a stream of metal vapor or atoms is deposited onto the film by vacuum deposition. This is accomplished by heating the metal particles in a vacuum and subjecting the metal to a stream of bombarding ions that causes the metal or metal oxide to be removed by sputtering. The metal or metal oxide is vaporized or sputtered, forming a metal vapor. The metal vapor impinges on the film surface, condenses, and forms a thin metallic coating on the film 112.

The thickness of the metallized layers 118, 120 can vary depending upon the manner in which the metal or metal oxide is applied to the film 112 and the desired result. When producing vacuum deposited metal films, very thin metal films or coatings with good uniform properties can be created. For instance, thin metal films having low cost, decreased basis weight, and increased flexibility may be produced. Thin metal films can also completely block light transmission while minimizing the amount of weight added to the overall product. In some examples, the films can have a thickness of less than about 3000 angstroms, including all increments of 1 angstrom thereafter, such as less than about 2000 angstroms, such as less than about 1000 angstroms, such as less than about 800 angstroms, such as less than about 600 angstroms, such as less than about 400 angstroms, such as less than about 200 angstroms, such as even less than about 100 angstroms. The metallized layer generally has a thickness of greater than about 10 angstroms, including increments of greater than 1 angstrom thereafter, such as greater than about 50 angstroms, such as greater than about 100 angstroms, such as greater than about 200 angstroms, such as greater than about 300 angstroms. Thus, the thickness of the metallized layer can be from about 1 angstrom to about 3000 angstroms including all increments of 1 angstrom therebetween.

The metallized layers 118, 120 can have the same properties and characteristics or can be formed so as to have different properties and characteristics to provide a myriad of visual textures and effects. For instance, each metallized layer 118 or 120 can be made from different metals and/or can have different thicknesses. The metallized layers can be formed with the same or different optical densities. Optical density is a numeric calculation that compares the amount of light transmitted through an area of the film to the amount of light originally striking or incident on the film. Optical density can be measured by the logarithmic value of light transmittance. As the percentage of light transmitted decreases, the optical density increases. Optical densities can generally vary from 0.0 to 7.0, including increments of 0.1 therebetween. The optical density of each metallized layer, can generally be greater than about 1, such as greater than about 2, such as greater than about 3, such as greater than about 4, such as greater than about 5, and generally less than about 7.

In one embodiment, the material is constructed such that the first metallized layer 118 has the same optical density as the second metallized layer 120. In another embodiment, the first metallized layer 118 has a higher optical density than the second metallized layer 120.

There may be advantages to designing the material 110 such that the first metallized layer 118 has a higher optical density than the second metallized layer 120. Varying the optical density on each side of the film 112 may produce a film with excellent physical properties. For instance, varying the optical density can prevent tin canning of the film (metallic streaks) 112 which can produce distortions and wrinkles.

In some embodiments, at least one of the metallized layers can be covered with a metal protective layer. The metal protective layer, for instance, can be coated on both the first metallized layer 118 and the second metallized layer 120. For example, as shown in FIG. 2, a metal protective layer 122 covers metallized layer 118 while a metal protective layer 124 covers metallized layer 120.

The metal protective layers 122 and 124 are designed to protect the metallized layer or layers from damage or degradation. For instance, the metal protective layers can comprise a cross-linked film that provides a hard protective covering (e.g., a shell). For instance, in one embodiment, the film can comprise a thermoset polymer.

In one embodiment, the metal protective layers 122 and 124 are formulated so that they can be applied to the metallized layer by using high speed printing techniques and can form an effective protective barrier at low thicknesses, which may be characterized by low basis weights. Ideally, the metal protective layers 122 and 124 add as little weight as possible to the overall product without affecting the drape characteristics of the laminate 110 while still providing a durable and tough protective layer over the metallized layers 118 and 120. For example, in one embodiment, the metal protective layers can have a basis weight of less than about 10 gsm, including increments of 0.5 gsm thereafter, such as less than about 8 gsm, such as less than about 5 gsm, such as less than about 4 gsm, such as less than about 3 gsm. The basis weight of the metal protective layer, for instance, can generally range from about 10 gsm to about 0.5 gsm and can include any increment of about 0.5 gsm therebetween.

In one embodiment, the metal protective layers 122 and 124 are formed from a solvent-based polymer system. The polymer, for instance, may comprise a curable polymer. For instance, in one embodiment, the metal protective layer contains an acrylic polymer, a urethane polymer, or mixtures thereof. The metal protective layer can be applied to the metallized layer, in one embodiment, using a printing device, such as a gravure printer. Once applied to the metallized layer, the metal protective composition is dried and cured to form the metal protective layer. In one embodiment, the metal protective layer is applied directly to and adhered to the first metallized layer without any intervening layers.

The metal protective layers 122 and 124 can be formulated to be clear and transparent, translucent, or opaque. In one embodiment, for instance, the metal protective layer can include a pigment such that the layer is opaque and colorized. In one embodiment, for instance, the metal protective layer can display a white color and can contain a pigment filler such as titanium dioxide, zinc sulfide, barium sulfate, calcium carbonate, kaolin, or the like. A pigment or coloring agent can be added to the metal protective layer, for instance, in order to improve the aesthetic qualities of the product.

Depending on the desired application, the nonwoven webs 114, 116 may optionally be constructed with a nonzero openness factor. For example, when a nonwoven web is applied to a metallized film, it may be desirable, in some cases, to permit some portion of the metallized film to be visible. In some embodiments, an exposed metallic layer may improve the insulating properties of the fabric laminate and may also convey an attractive glint or sparkle to the fabric laminate. To this end, the openness factor may be defined as the percent of open space in a material (e.g., an openness factor of 10% indicates 90% material and 10% open space in a planar area). In some embodiments, the openness factor of the material may be as little as about 0% while remaining less than 100% open, such as, for example, having an openness factor selected from between about 0% open to about 50% open (e.g., in 1% increments). In some embodiments, the openness factor of the web may be greater than about 0% open to less than about 30% open, including increments of 1% therebetween, such as less than about 20% open, including ranges less than increments of 1% thereafter, such as less than about 15% open, such as less than about 10% open, such as less than about 5% open. As the openness factor increases, more of the film will be exposed by the material. One manner of measuring the openness factor is to measure the area of the open areas and calculate the percentage of area that has no material. In one example, a digital microscope or high resolution camera may be used to capture an image of the material and the image used to calculate the percentage that does not have material. A Motic digital microscope and Motic Image Plus 2.0 Software may be used to measure the openness factor of various materials.

Laminates made according to the present disclosure can be incorporated into all different types of coverings for architectural structures without limitation.

Figure 3:
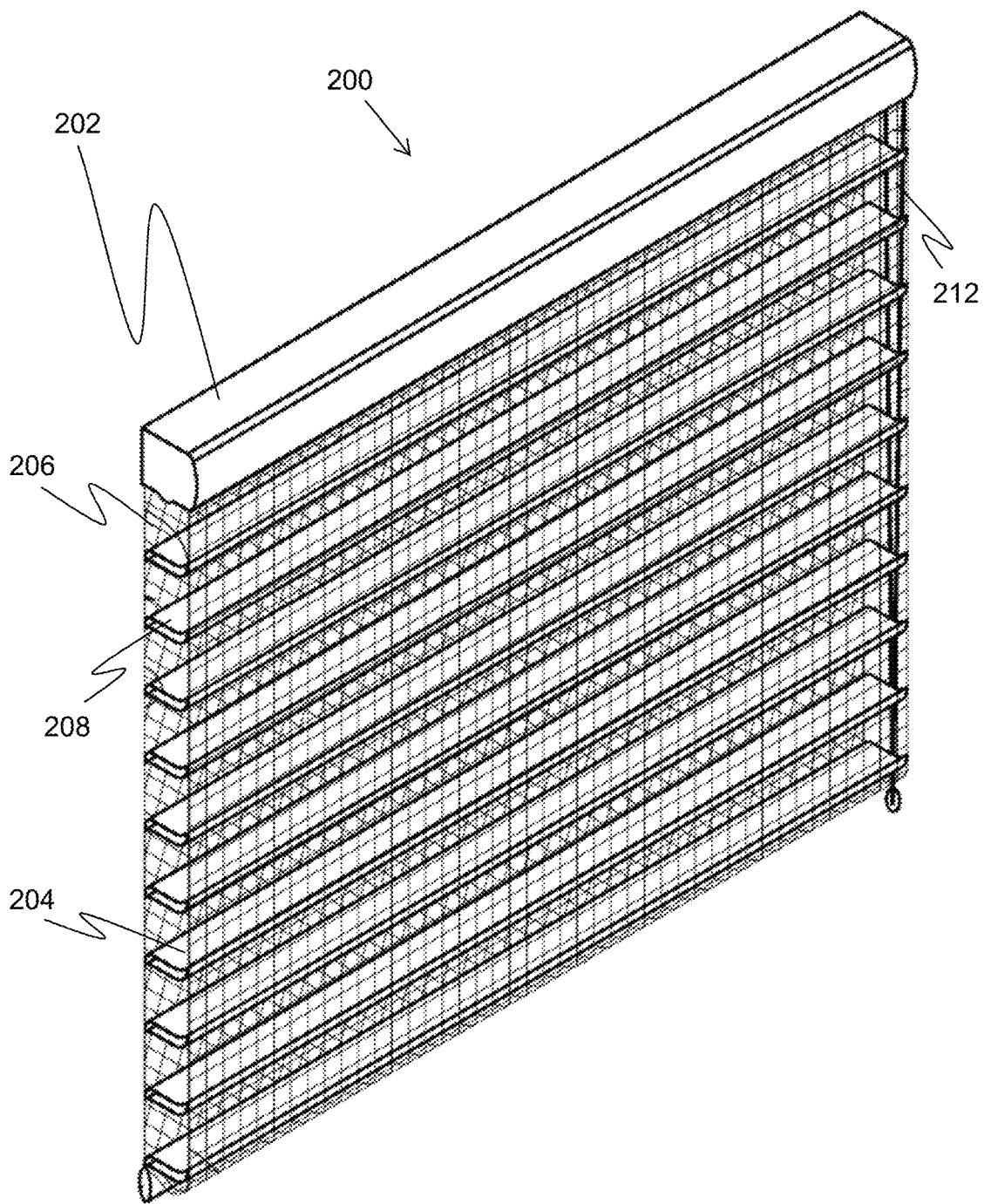
FIG. 3 is a perspective view of one embodiment of an architectural structure covering.

FIG. 3 depicts one embodiment of a shade 200 having generally horizontal vanes, such as vane elements 208. The vane elements 208 can be made from the laminates of the present disclosure, such as laminate 10 or laminate 110. The laminate or composite material of the present disclosure is particularly well suited for use in constructing the vane elements 208. For example, as will be described in greater detail below, the vane elements 208 have curved surfaces. In addition, the vane elements 208 move from a relatively flat position to an open, cellular position. Thus, the material used to produce the vane elements 208 should be flexible in one direction, particularly the length direction extending from the back of the covering 200 to the front of the covering 200. The composite material or laminate of the present disclosure is particularly flexible in the length direction while having greater stiffness properties in the width direction. The greater stiffness properties in the width direction are particularly advantageous in the covering 200 shown in FIGS. 3-6. The laminate of the present disclosure, for instance, maintains its shape and does not undesirably crease or form non-uniform undulations when the covering is being operated and the vane elements 208 are undergoing shape changes. On the other hand, the flexible nature of the material in the length direction permits the shape changes of the vane elements 208 to occur without undesirable resistance or causing the material to buckle. Ultimately, the laminate of the present disclosure produces coverings for architectural structures, such as covering 200 having an elegant and aesthetic appearance, while remaining highly functional.

The rotation of the vane elements 208 can proceed as shown in FIG. 4-FIG. 6. A roller 214 in a headrail 202 attached to an operating cord 212 may cause relative motion between a front support member 204 and a rear support member 206 to induce the rotation and collapse of the vane 208 into vane 208'. It is apparent that the vane 208' has curvatures formed at the front edge 216 and the rear edge 218 while the upper face 220 and the lower face 222 separate as shown. This movement may advantageously occur cleanly and uniformly across the width of vanes 208 prepared using laminates as herein with favorable stiffness ratios. Of additional advantage, vanes with increased stiffness in the horizontal direction (i.e., into page as shown) may still fold into a compact arrangement, such as into the shape of vane 208" as aided by the directional stiffness of the webs applied to the laminate 10, 110.

Figure 7:
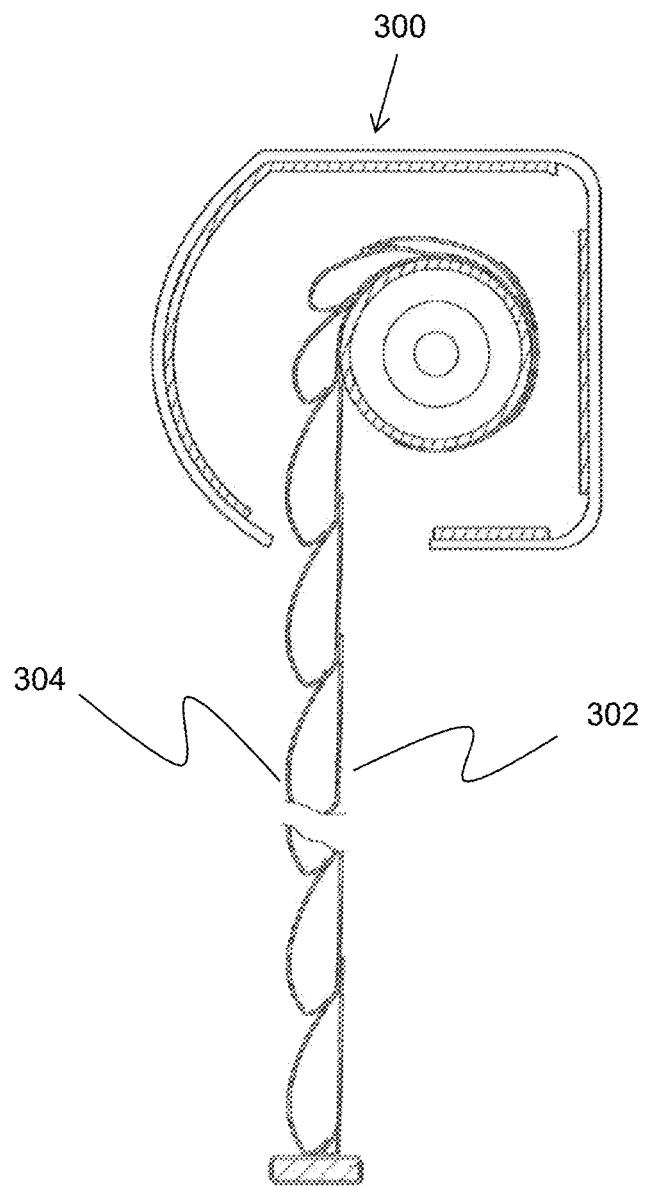
FIG. 7 is a cross-sectional view of another embodiment of an architectural structure covering in accordance with the present disclosure.

Referring to FIG. 7, an embodiment of a roller shade 300 incorporating the fabric laminate of the present disclosure, such as in the vanes 304, the backing layer 302, or both. Of particular advantage in roll-up shades, improving the directional stiffness in the machine direction (e.g., into page) may not adversely affect the compact rolling up of the shade material. While the shade pictured has a combination of vanes 304 and a backing layer 302, the material of the present disclosure may be used, without limitation, in a vane, in a backing layer, or in both a vane and a backing layer of a shade. The laminate of the present disclosure containing two nonwoven webs having fibers oriented in the same direction provides flexibility in the direction perpendicular to fiber orientation while also providing desirable stiffness properties in the direction of fiber orientation. This construction produces a material that has flexibility in the length direction and greater stiffness properties along the width direction thus allowing the material to form curvatures while maintaining a uniform appearance. It is to be understood that the fabric of the present disclosure may be used in any variety of architectural covering, including without limitation largely planar shades and cellular shades.

Figure 8:
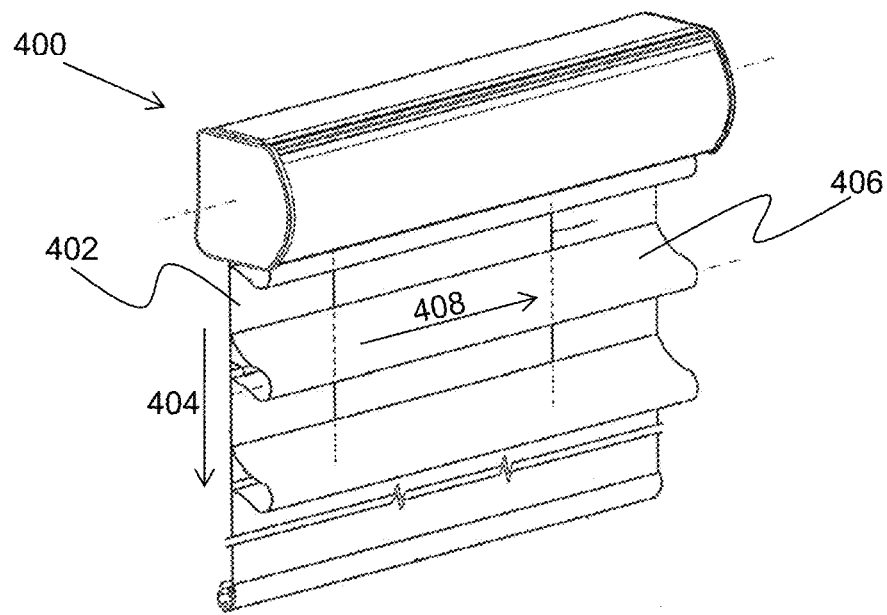
FIG. 8 is a perspective view of another embodiment of an architectural structure covering in accordance with the present disclosure.

Another embodiment of a roll-up shade 400 is shown in FIG. 8. In particular, a backing layer 402 comprising a material of the present disclosure is aligned with augmented stiffness in the direction 404 (e.g., the machine direction of the backing layer). Furthermore, a vane 406 is attached to the backing layer. The vanes 406 are operable between a closed substantially planar configuration and an open configuration with top and bottom edges brought closer together and the vane forming a curvature therebetween. The vane 406 contains a material of the present disclosure having an increased stiffness in the direction 408 (e.g., the machine direction of the vane material). In this manner, the material of the backing layer 402 is provided greater strength for supporting the weight of the shade in one direction while the vanes 406 are provided greater stiffness for preserving an attractive shape and surface finish in a substantially different direction.

Figure 9:
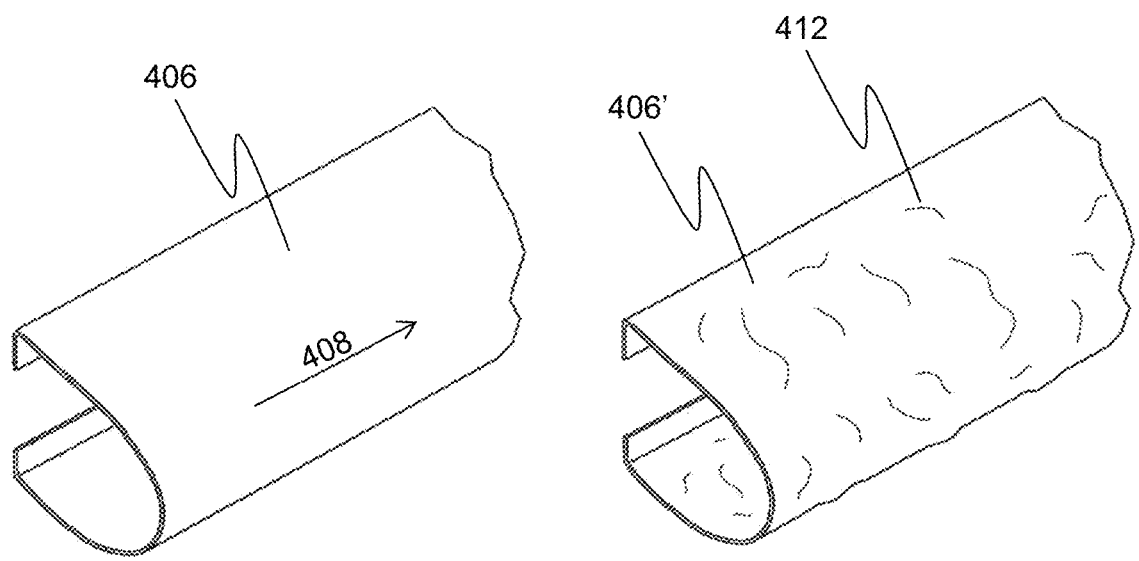
FIG. 9 is a perspective view of vanes that may be incorporated into the architectural structure covering illustrated in FIG. 8.

One advantage of increasing the vane stiffness in one direction, such as a substantially horizontal direction across the length of the vane, is shown in FIG. 9. For example, a vane 406 with increased stiffness may have a smooth surface which cleanly folds uniformly throughout. In contrast, absent the desired stiffness, a comparative vane 406' may display unwanted wrinkles 412 which may disrupt the appearance.

The foregoing disclosure may be better understood in view of the following examples.

EXAMPLES

Five samples were prepared, each having a 36 gauge polyethylene terephthalate (PET) film sandwiched between a first nonwoven web and a second nonwoven web. The film was metallized on both sides, and one side of the metallized film was covered with a protective topcoat layer.

For comparative purposes, Samples 1-3 contain carded webs while Samples 4-5 contain wet laid webs. Sample 1-3 were formed entirely from polyester fibers. Samples 4 and 5, on the other hand, contained synthetic fibers combined with binder fibers. The nonwoven webs of Samples 1 and 2 were carded and hydroentangled, while the nonwoven web of Sample 3 was carded and thermally point-bonded. The hydroentangled webs of Samples 1 and 2 were obtained from Dupont and are sold under the name SONTORA. The nonwoven carded web of Sample 3 was obtained from Hollingsworth & Vosc of East Walpole, Massachusetts.

The nonwoven webs of Samples 4 and 5 were wet laid webs which contained different amounts of binder fibers. The nonwoven web of Sample 4 contained 50% binder fibers, and the nonwoven web of Sample 5 contained 35% binder fibers. The nonwoven webs of Samples 4 and 5 were produced by Nippon Paper Papylia Co., LTD.

The basis weight of each sample was evaluated using a JA King cutting system to prepare eight 2.75 inch disk specimens and an Ohaus scale to weigh the disks. The sample descriptions and basis weights are given in Table 1.

TABLE 1

| Sample No. | (First web/Film/Second web) | Basis Weight (gsm) |
|---|---|---|
| 1 | 1.0 oz/36 ga/1.0 oz | 95.5 |
| 2 | 0.7 oz/36 ga/1.0 oz | 93.0 |
| 3 | 18 gsm/36 ga/18 gsm | 67.0 |
| 4 | 15 gsm/36 ga/15 gsm | 65.0 |
| 5 | 15 gsm/36 ga/15 gsm | 63.5 |

An X-Rite Densitometer was used to evaluate the optical density of the samples. The test was repeated on 5 specimens. The results are given in Table 2.

TABLE 2

| Sample No. | Opacity | | | |
|---|---|---|---|---|
| | Mean | St. Dev. | Min. | Max. |
| 1 | 4.85 | 0.02 | 4.83 | 4.88 |
| 2 | 6.01 | 0.04 | 5.97 | 6.05 |
| 3 | 5.01 | 0.04 | 4.97 | 5.06 |
| 4 | 4.62 | 0.05 | 4.58 | 4.70 |
| 5 | 4.78 | 0.10 | 4.66 | 4.93 |

The stiffness of the samples was evaluated using a Thwing-Albert Handle-O-Meter Softness Tester. A total of five machine direction specimens and five cross direction specimens were cut to size (4 inch by 4 inch) and measured for each material. The results are given in Table 3. The reported ratio is calculated as the ratio of the mean machine direction stiffness to the mean cross direction stiffness.

TABLE 3

| Sample No. | Machine Direction (g) | | | | Cross Direction (g) | | | | Ratio Mean |
|---|---|---|---|---|---|---|---|---|---|
| | Mean | St. Dev. | Min. | Max. | Mean | St. Dev. | Min. | Max. | |
| 1 | 21.8 | 1.29 | 20.1 | 23.0 | 5.6 | 0.42 | 4.9 | 5.9 | 3.9 |
| 2 | 21.8 | 1.05 | 21.0 | 23.6 | 5.6 | 0.30 | 5.3 | 6.1 | 3.9 |
| 3 | 16.6 | 0.73 | 15.9 | 17.7 | 6.6 | 0.00 | 6.6 | 6.6 | 2.5 |
| 4 | 22.7 | 0.66 | 21.6 | 23.3 | 8.1 | 0.48 | 7.6 | 8.8 | 2.8 |
| 5 | 20.4 | 0.60 | 19.7 | 21.2 | 2.9 | 1.66 | 0.0 | 4.1 | 7.0 |

The thickness was measured with a Thwing-Albert ProGage Thickness Tester set to a pressure of 0.6 psi, a dwell time of 3 seconds, a foot size of 1.130 inches, and a dead weight of 274 g. The test consisted of 10 specimen readings. The results are presented in Table 4.

TABLE 4

| Sample No. | Thickness (mm) | | | |
|---|---|---|---|---|
| | Mean | St. Dev. | Min. | Max. |
| 1 | 0.16 | 0.01 | 0.15 | 0.17 |
| 2 | 0.24 | 0.01 | 0.22 | 0.26 |
| 3 | 0.19 | 0.00 | 0.18 | 0.19 |
| 4 | 0.09 | 0.00 | 0.09 | 0.09 |
| 5 | 0.07 | 0.00 | 0.07 | 0.08 |

It can be seen that the binder fiber content and the web forming techniques can be used to directly vary the physical properties of the fabric. As shown above, for instance, the use of a wet laid web in conjunction with binder fibers at different amounts allows for control over the stiffness of the material in the cross-direction versus the stiffness of the material in the machine direction. In this manner, laminates can be made according to the present disclosure that have tailored physical properties for a particular application.

The foregoing description has broad application. It should be appreciated that the concepts disclosed herein may apply to many types of architectural structure coverings, in addition to the coverings described and depicted herein. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations.

While the foregoing description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

The phrases "at least one," "one or more," and "and/or," as used herein, are open-ended expressions that are both conjunctive and disjunctive in operation. The term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

All apparatuses and methods disclosed herein are examples implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this description by this reference, with each claim standing on its own as a separate embodiment of the present disclosure. In the claims, the term "comprises/comprising" does not exclude the presence of other elements or steps. Furthermore, although individually listed, a plurality of elements may be implemented by, e.g., a single unit. Additionally, although individual features may be included in different claims, these may possibly and advantageously be combined, and the inclusion in different claims does not imply that a combination of features is not feasible and/or advantageous.

What is claimed:

1. A fabric laminate for an architectural covering comprising:
   a film layer having a first side, and a second and opposite side, said film layer defining a first direction and a second direction, said second direction being transverse to said first direction;
   wherein the film layer comprises a polyester film;
   a first nonwoven web positioned on said first side of said film layer, said first nonwoven web comprising fibers and a binder;
   a second nonwoven web positioned on said second side of said film layer, said second nonwoven web comprising fibers and a binder; and
   a first metallized layer positioned in between said first side of said film layer and said first nonwoven web, and
   a first metal protective layer positioned in between said first metallized layer and said first nonwoven web, wherein the first metal protective layer comprises a curable polymer;
   wherein the first metallized layer is positioned directly adjacent to the first side of the film layer and directly adjacent to the first metal protective layer, and
   wherein the first metal protective layer is positioned directly adjacent to the first nonwoven web with no intervening layers therebetween;
   wherein a majority of said fibers in said first nonwoven web and a majority of said fibers in said second nonwoven web are oriented along said first direction; and wherein said first nonwoven web comprises a wet laid web and said second nonwoven web comprises a wet laid web.

2. A fabric laminate as defined in claim 1, wherein said binder in said first nonwoven web and said binder in said second nonwoven web both comprise binder fibers, the binder fibers forming thermal bonds between fibers within each web.

3. A fabric laminate as defined in claim 2, wherein said binder fibers comprise conjugate fibers, said conjugate fibers including a core polymer surrounded by a sheath polymer, said conjugate fibers being thermally bonded to said fibers within each web.

4. A fabric laminate as defined in claim 1, wherein the stiffness of said laminate in said first direction is greater than the stiffness of said laminate in said second direction.

5. A fabric laminate as defined in claim 1, wherein the ratio of the stiffness of said laminate in said first direction to the stiffness of said laminate in said second direction is greater than about 2.0.

6. A fabric laminate as defined in claim 5, wherein the ratio of the stiffness of said laminate in said first direction to the stiffness of said laminate in said second direction is greater than about 4.0 and less than about 10.0.

7. A fabric laminate as defined in claim 1, wherein said first nonwoven web and said second nonwoven web comprise polyester fibers.

8. A fabric laminate as defined in claim 1, wherein at least one of said first nonwoven web and said second nonwoven web has a basis weight from about 5 gsm to about 18 gsm.

9. A fabric laminate as defined in claim 1, where at least one of said first nonwoven web and said second nonwoven web has a thickness of less than about 0.15 mm and greater than about 0.03 mm.

10. A fabric laminate as defined in claim 1, further comprising a second metallized layer in between said second side of said film layer and said second nonwoven web, and a second metal protective layer positioned in between said second metallized layer and said second nonwoven web.

11. A fabric laminate for an architectural covering comprising:
a film layer having a first side and a second and opposite side, said film layer defining a first direction and a second direction, said second direction being perpendicular to said first direction;
wherein the film layer comprises a polyester film;
a first nonwoven web positioned on said first side of said film layer, said first nonwoven web comprising fibers; and
a second nonwoven web positioned on said second side of said film layer, said second nonwoven web comprising fibers;
a first metallized layer positioned in between said first side of said film layer and said first nonwoven web, and
a first metal protective layer positioned in between said first metallized layer and said first nonwoven web, wherein the first metal protective layer comprises a curable polymer;
wherein the first metallized layer is positioned directly adjacent to the first side of the film layer and directly adjacent to the first metal protective layer, and
wherein the first metal protective layer is positioned directly adjacent to the first nonwoven web with no intervening layers therebetween;
wherein said first nonwoven web and said second nonwoven web are both comprised of synthetic fibers combined with binder fibers; and
wherein a majority of said fibers in said first nonwoven web and a majority of said fibers in said second nonwoven web are oriented along said first direction, and wherein said fabric laminate has a stiffness in said first direction and a stiffness in said second direction and wherein a ratio of the stiffness of said laminate in said first direction to the stiffness of said laminate in said second direction is greater than 4.0.

12. A fabric laminate as defined in claim 11, comprising a second metallized layer positioned in between said second side of said film layer and said second nonwoven web.

13. A fabric laminate as defined in claim 11, wherein the binder fibers form thermal bonds between fibers within each web.

14. A fabric laminate as defined in claim 13, wherein said binder fibers comprise conjugate fibers, said conjugate fibers including a core polymer surrounded by a sheath polymer, said conjugate fibers being thermally bonded to said synthetic fibers.

15. A fabric laminate as defined in claim 11, wherein at least one of said first nonwoven web and said second nonwoven web has a basis weight from about 5 gsm to about 18 gsm.

16. A fabric laminate as defined in claim 11, where at least one of said nonwoven web and said second nonwoven web has a thickness of less than about 0.15 mm and greater than about 0.03 mm.

17. An architectural covering comprising a fabric laminate as defined in claim 11.

18. An architectural covering as defined in claim 17, wherein said fabric laminate comprises a vane.

* * * * *